United States Patent [19]
Nakai

[11] Patent Number: 6,122,104
[45] Date of Patent: Sep. 19, 2000

[54] DIFFRACTIVE OPTICAL ELEMENT AND OPTICAL SYSTEM HAVING THE SAME

[75] Inventor: Takehiko Nakai, Kawasaki, Japan

[73] Assignee: Canon Kabushiki Kaisha, Tokyo, Japan

[21] Appl. No.: 09/130,171

[22] Filed: Aug. 6, 1998

[30] Foreign Application Priority Data

Aug. 20, 1997 [JP] Japan .................................. 9-239026

[51] Int. Cl.$^7$ ..................................................... G02B 5/18
[52] U.S. Cl. .......................................... 359/576; 359/569
[58] Field of Search .................................... 359/570, 569, 359/575, 576

[56] References Cited

U.S. PATENT DOCUMENTS

| 3,585,284 | 6/1971 | Macovski | 359/576 |
|---|---|---|---|
| 4,245,882 | 1/1981 | Chang | 350/3.72 |
| 5,017,000 | 5/1991 | Cohen | 351/161 |
| 5,044,706 | 9/1991 | Chen | 359/357 |
| 5,048,925 | 9/1991 | Gerritsen et al. | 359/569 |
| 5,446,588 | 8/1995 | Missig et al. | 359/565 |
| 5,737,113 | 4/1998 | Kuramochi et al. | 359/259 |

FOREIGN PATENT DOCUMENTS

| 195 33 591 | 3/1996 | Germany . |
|---|---|---|
| 4-213421 | 8/1992 | Japan . |
| 6-324262 | 11/1994 | Japan . |
| 8-307154 | 11/1996 | Japan . |
| 9-127321 | 5/1997 | Japan . |
| 9-127322 | 5/1997 | Japan . |
| 10-133149 | 5/1998 | Japan . |
| WO 96/00912 | 1/1996 | WIPO . |

OTHER PUBLICATIONS

J.N. Latta, "Analysis of Multiple Hologram Optical Elements with Low Dispersion and Low Aberrations," Applied Optics, vol. 11, No. 8, Aug. 1972, pp. 1686–1696.

S.M. Ebstein, "Achromatic Diffractive Optical Elements," Proceedings of the SPIE: Diffractive and Holographic Optics Technology II, vol. 2404, Feb. 9–10, 1995, pp. 211–216.

M.W. Farn, et al., "Diffractive Doublet Corrected On–Axis at Two Wavelengths," Proceedings of the SPIE: International Lens Design Conference, vol. 1354, Jun. 11–14, 1990, pp. 24–29.

Y. Arieli, et al., "Design of a Diffractive Optical Element for Wide Spectral Bandwidth," Optical Letters, vol. 23, No. 11, Jun. 1, 1998, pp. 823–824.

C. Londoño, et al., "The Design of Achromatized Hybrid Diffractive Lens Systems," Proceedings of the SPIE: International Lens Design Conference, vol. 1354 (Jun. 11–14, 1990), pp. 30–37.

Primary Examiner—Cassandra Spyrou
Assistant Examiner—Euncha Cherry
Attorney, Agent, or Firm—Fitzpatrick, Cella, Harper & Scinto

[57] ABSTRACT

In a diffractive optical element, which is formed by laminating at least three layers of diffraction gratings made of at least three kinds of materials which differ in dispersion, at least three design wavelengths are set.

17 Claims, 7 Drawing Sheets

DIFFRACTIVE OPTICAL ELEMENT AND OPTICAL SYSTEM HAVING THE SAME

BACKGROUND OF THE INVENTION

1. Field of the Invention

The present invention relates to a diffractive optical element having such a grating structure that a light flux of a useful wavelength region concentrates at a specific order (design order), and to an optical system having the diffractive optical element.

2. Description of Related Art

While it has been practiced to abate a chromatic. aberration of an optical system by combining different lens materials, another method for abating a chromatic aberration by arranging, on a lens surface or within an optical system, a diffractive optical element (or a diffraction grating) having a diffracting function was disclosed in optical literature, such as "International Lens Design Conference (1990)", SPIE Vol. 1354, etc., and the publications of Japanese Laid-Open Patent Applications No. HEI 4-213421 and No. HEI 6-324262 and U.S. Pat. No. 5,044,706. This method is based on a physical phenomenon that a direction in which a chromatic aberration takes place for rays of light of a certain wavelength region on a refractive surface becomes inverse to that on a diffractive surface.

Comparing a refractive surface (lens surface) with a diffractive surface in respect of the function on rays of incident light, one ray of light remains one after refraction on the refractive surface, whereas one ray of light is split into a plurality of rays of different orders when it is diffracted by the diffractive surface. Therefore, in using a diffractive optical element, the structure of the grating of the diffractive optical element is decided in such a way as to cause a light flux of a useful wavelength region to concentrate at a specific diffraction order (hereinafter referred to as the design order). With a light flux concentrating at a specific diffraction order, such as a + first order or a − first order, rays of diffraction light of orders other than the specific diffraction order have a low degree of intensity. When the intensity of the rays becomes zero, the diffraction light ceases to exist.

In enhancing the efficiency of diffraction for a diffraction light of an m-th order, a phase difference giving structure is arranged to give a phase difference of $2\pi m$ to rays of each optical path in the diffracting direction. The rays of light are then caused by this arrangement to interfere with each other and are thus intensified.

Figure 12:
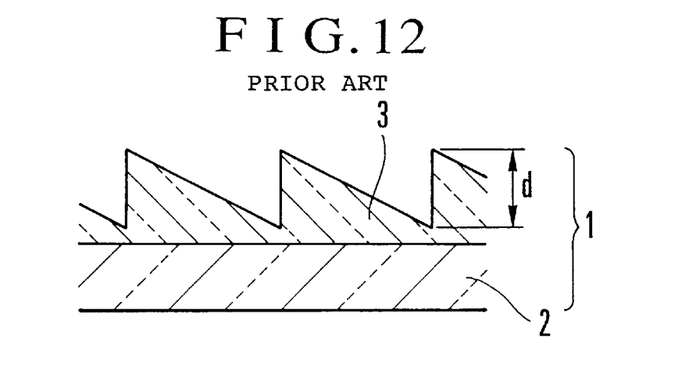
FIG. 12 is a sectional view showing by way of example the arrangement of essential parts of the conventional diffractive optical element.

FIG. 12 shows a structural arrangement of a transmission type diffractive optical element 1. In the diffractive optical element 1, the grating thickness of a diffraction grating 3 is assumed to be d and the refractive index of the material of the diffraction grating 3 is assumed to be n. In order to give the phase difference of $2\pi m$ to light of a wavelength $\lambda$ of an m-th order of diffraction, the structural arrangement is required to satisfy the following condition:

$$2\pi m = 2\pi d (n-1) / \lambda \ldots \quad (1).$$

In a case where the condition of the formula (1) above is established at each pitch of the grating, the diffraction efficiency becomes higher.

The actual structure of the diffractive optical element which is necessary for attaining this diffracting function is called a kinoform. There are various known modes of arranging the kinoform structure. In one known mode, spans for which the phase difference of $2\pi m$ is given are arranged to continue one after another. In another known mode, a continuous phase difference distribution of kinoform is approximated stepwise in a binary shape. In a further known mode, a minute periodic structure of kinoform is approximated in a triangular wave shape. Each of these structures is arranged either on the surface of a flat plate or on a convex or concave lens surface within an optical system. Further, the diffractive optical element of this type is manufactured, for example, with a mold prepared by a semiconductor manufacturing process such as lithography or by machining or with a replica formed on the basis of such a mold.

The diffractive optical element is capable of greatly abating a chromatic aberration taking place on a refractive surface due to dispersion by a glass material. The diffractive optical element can be arranged to have a great aberration abating effect, like an aspheric lens, by varying the period of its periodic structure.

In the case of the prior example mentioned above, various aberrations, particularly a chromatic aberration, are lessened by the effect of diffraction. The effect attained by including the diffractive optical element in an optical system can be confirmed, for example, on a drawing showing aberrations or the like. However, if the diffraction efficiency is not high for the diffraction light of the design order, no light might be existing there in actuality. It is, therefore, necessary to have a sufficiently high diffraction efficiency for diffraction light of design order. Further, in a case where there is any light having diffraction orders other than the design order, that light is imaged at a different part from where the light of the design order is imaged. Such a light thus becomes flare light to lower the contrast of an image. Therefore, it is important, for any optical system that is designed to utilize a diffraction effect, to sufficiently consider a spectral distribution of diffraction efficiency and the behavior of light of diffraction orders than the design order.

Figure 13:
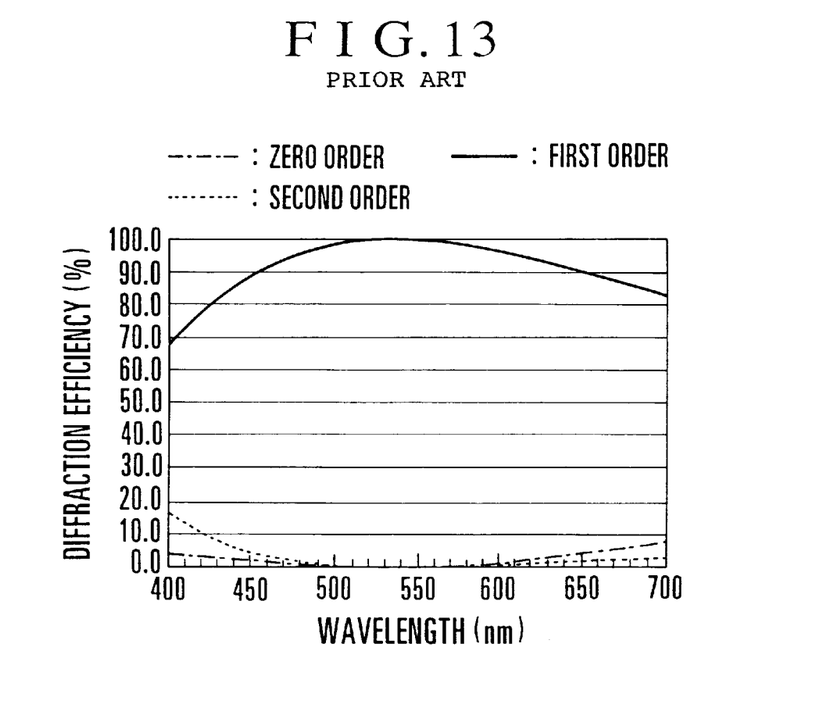
FIG. 13 is a graph showing the diffraction efficiency of the conventional diffractive optical element.
Figure 14:
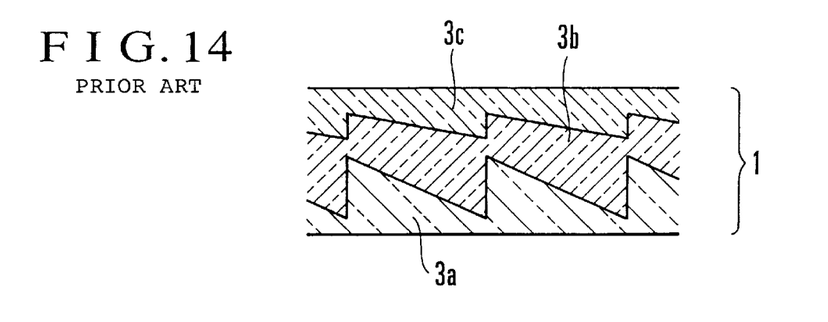
FIG. 14 is a sectional view showing another example of conventional diffractive optical element.

FIG. 13 shows the spectral characteristic of diffraction efficiency obtained for a specific diffraction order with the diffractive optical element shown in FIG. 12 formed on a certain surface within an optical system. In FIG. 13, the abscissa axis indicates wavelength and the ordinate axis indicates the diffraction efficiency. The diffractive optical element is designed to have the diffraction efficiency become highest at the first order of diffraction (shown in a full line curve in FIG. 13). In other words, the design order is the first order. FIG. 13 further shows the diffraction efficiency for diffraction orders near the design order, i.e., the zero order and the second order (($1\pm 1$)-th order). As shown in FIG. 13, at the design order, the diffraction efficiency becomes highest at a certain wavelength (hereinafter referred to as a "design wavelength") and gradually decreases at other wavelengths. The reason for this is as follows. The grating thickness required for making the phase difference $2\pi$ is as expressed by the formula (1). In a case where the grating thickness is set to satisfy the condition of this formula for the design wavelength, this condition becomes somewhat unsatisfied for other wavelengths, thereby causing a drop in diffraction efficiency.

The drop portion of the diffraction efficiency at the design order becomes diffraction light of other orders and comes to appear as flare light. In a case where the diffractive optical element is provided with a plurality of diffraction gratings, the drop in diffraction efficiency at wavelengths other than the design wavelength eventually causes a decrease in transmission factor.

Figure 18:
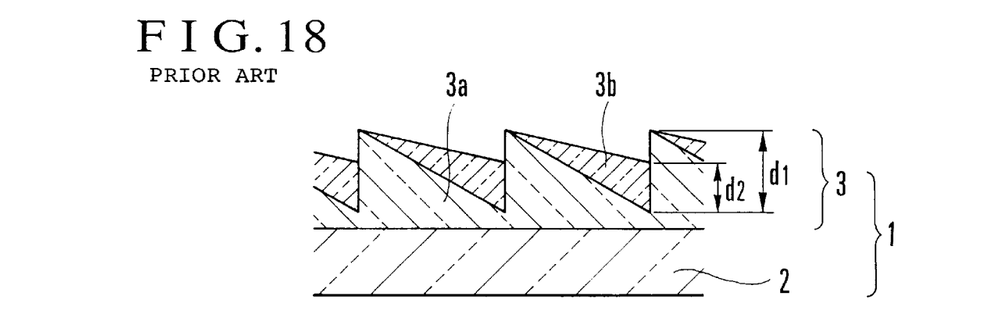
FIG. 18 is a sectional view showing essential parts of a diffractive optical system disclosed in Japanese Patent Application No. HEI 8-307154.
Figure 19:
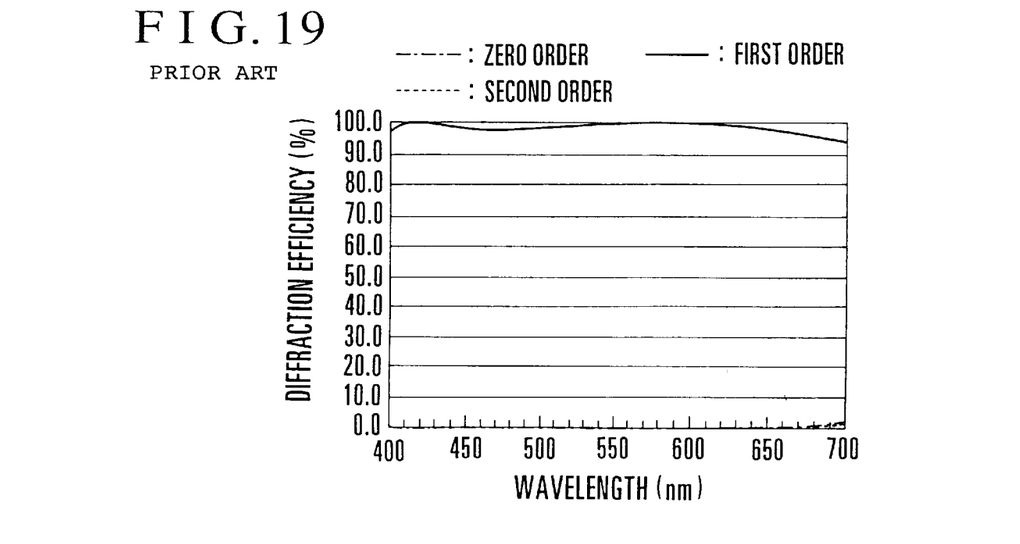
FIG. 19 is a graph showing the diffraction efficiency of the diffractive optical system disclosed in Japanese Patent Application No. HEI 8-307154.

In view of the above problem, the inventor of the present invention has developed a diffractive optical element, as disclosed in Japanese Patent Application No. HEI 8-307154, which has a grating structure as shown in FIG. 18. In the grating structure shown in FIG. 18, a plurality of diffraction gratings including a first diffraction grating 3a and a second diffraction grating 3b, which are made of at least two kinds of materials which differ in dispersion, overlap each other. With the diffractive optical element arranged in this manner, its diffraction efficiency remains high at the design order over the whole region of useful wavelengths, as shown in FIG. 19.

Another diffractive optical element formed by overlaying on each other diffraction gratings of materials of two different kinds was disclosed in U.S. Pat. No. 5,017,000, etc. This optical element, however, relates to a multiple focus lens and nothing has been disclosed with respect to how to enhance its diffraction efficiency.

Further, the publications of Japanese Laid-Open Patent Applications No. HEI 9-127321 and No. HEI 9-127322 have disclosed diffractive optical elements arranged to prevent color fluctuations and generation of flare light due to light of unnecessary diffraction orders by lowering the wavelength dependency of the diffraction efficiency. More specifically, the diffractive optical element is formed by laminating a plurality of different optical materials (two or three optical materials) with one or two relief patterns formed at the boundary face between the different optical materials.

Figure 15:
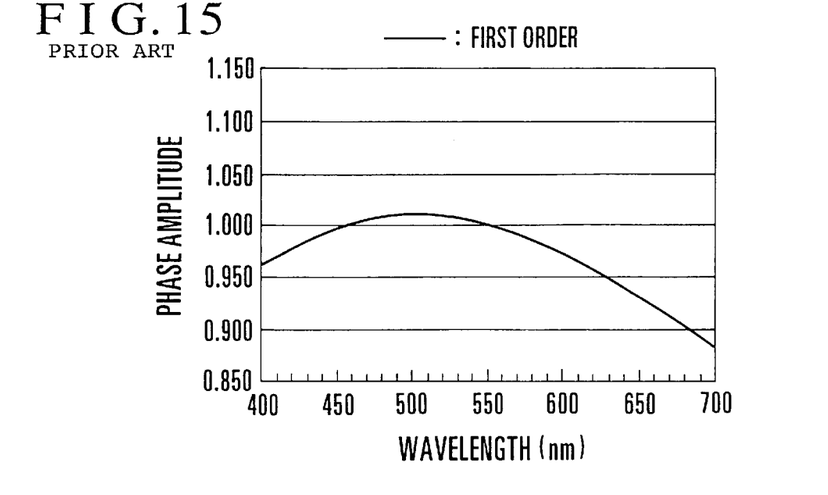
FIG. 15 is a graph showing the phase amplitude of the conventional diffractive optical element of FIG. 14.
Figure 16:
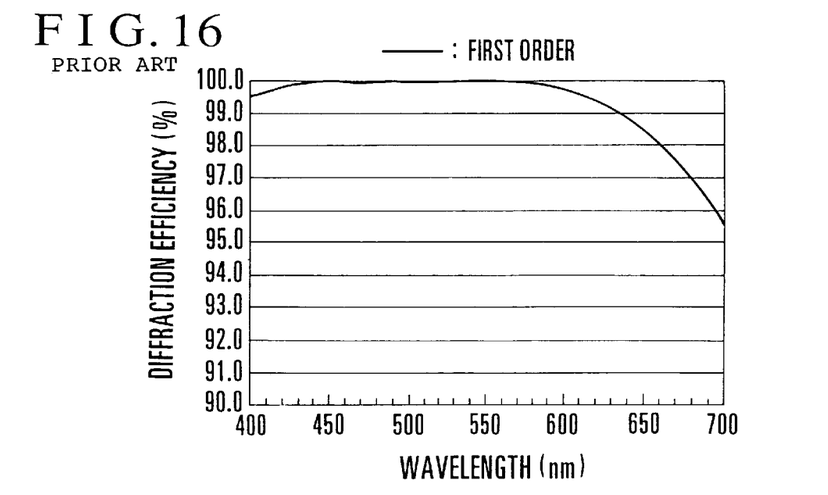
FIG. 16 is a graph showing the diffraction efficiency obtained at a design order of the conventional diffractive optical element of FIG. 14.
Figure 17:
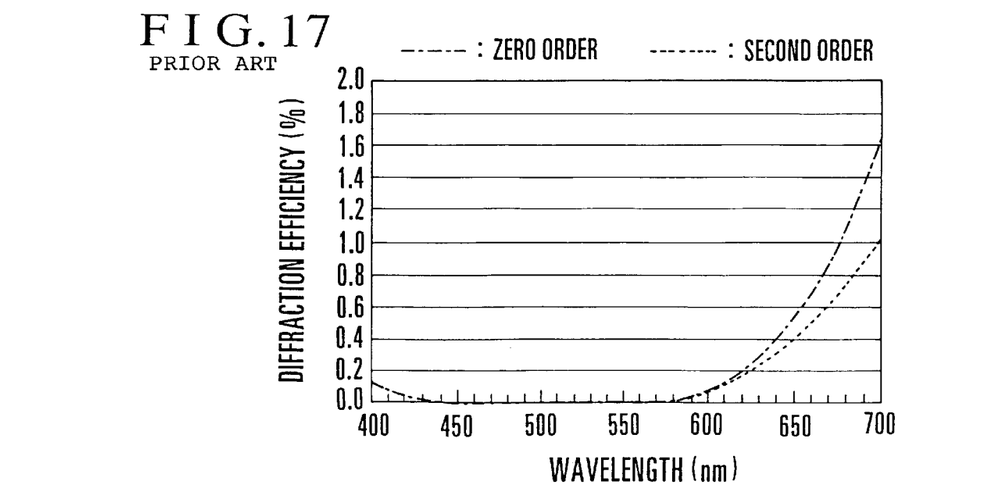
FIG. 17 is a graph showing the diffraction efficiency obtained at orders near the design order of the conventional diffractive optical element of FIG. 14.

In the diffractive optical element disclosed in the above Japanese Laid-Open Patent Application No. HEI 9-127321 or No. HEI 9-127322, there are two wavelengths at which the phase amplitude becomes "1", as shown in FIG. 15. The diffractive optical element is thus arranged, on the basis of these wavelengths, to have two optimized wavelengths (design wavelengths) where the maximum diffraction efficiency can be obtained. FIG. 16 shows the diffraction efficiency obtained at the design order, and FIG. 17 shows the diffraction efficiency obtained at diffraction orders in the neighborhood of the design order. Since there are two design wavelengths, the diffraction efficiency trends downward at either of two ends of the useful wavelength region of 400 nm to 700 nm. In the case of FIG. 16, the diffraction efficiency drops to a level of 94% or thereabout on the side of longer wavelengths. Then, in inverse proportion to the diffraction efficiency shown in FIG. 16, the diffraction efficiency obtained at diffraction orders in the neighborhood of the design order increases up to 2% or thereabout on the side of longer wavelengths, as shown in FIG. 17.

Therefore, the use of the diffractive optical element, under special service conditions, for the useful wavelength region of 400 nm to 700 nm has not been always satisfactory for reducing the amount of generation of flare light due to light of unnecessary orders. The diffractive optical element thus has been desired to have a higher diffraction efficiency over the useful wavelength region. The above-stated special service conditions include, for example, a case where the diffractive optical element having the above-stated diffraction efficiency is applied to a photo-taking lens of a camera or the like. In the case of the camera, a film is used on an evaluation plane and there are various photo-taking conditions (object and exposure conditions) occurring. Among such various conditions, in the event of, for example, a light source of a high degree of luminance existing at a part of the object, the high luminance light source is saturated more than an exposure apposite to the film while an apposite exposure is adjusted to other parts of the object in taking a shot. In that event, since the exposure for the light source is several times as much as the apposite exposure, even a slight amount of diffraction light of orders near the design order might be multiplied several times. Then, the slight amount of diffraction light tends to result in flare light around the light source, like a halo.

BRIEF SUMMARY OF THE INVENTION

It is an object of the invention to provide a diffractive optical element, or an optical system having the diffractive optical element, which has a high diffraction efficiency over the whole useful wavelength region with the amount of unnecessary diffraction light made small.

To attain the above object, in accordance with an aspect of the invention, there is provided a diffractive optical element, which is formed by laminating at least three layers of diffraction gratings made of at least three kinds of materials which differ in dispersion, wherein at least three design wavelengths are set.

The diffractive optical element according to the invention has the following features.

In the diffractive optical element according to the invention, the above-mentioned at least three layers of diffraction gratings are laminated on a base plate, and, letting the diffraction gratings be assumed to be a first diffraction grating, a second diffraction grating and an L-th diffraction grating, as counted from the base plate, a grating thickness of the first diffraction grating be denoted by d1, a grating thickness of the second diffraction grating be denoted by d2, a grating thickness of the L-th diffraction grating be denoted by dL, a refractive index of the first diffraction grating at a wavelength λ be denoted by n1(λ), a refractive index of the second diffraction grating at the wavelength λ be denoted by n2(λ), a refractive index of the L-th diffraction grating at the wavelength λ be denoted by nL(λ), an arbitrary wavelength within a useful wavelength region be denoted by λ0, and a design order of diffraction be denoted by m, it is preferable to satisfy the following condition:

$$0.9217 \leq$$
$$\{(n1(\lambda 0)-1)d1 \pm (n2(\lambda 0)-1)d2 \pm \ldots \pm (nL(\lambda 0)-1)dL\}/m\lambda 0 \leq 1.0783.$$

Further, in the diffractive optical element according to the invention, the above-mentioned at least three layers of diffraction gratings are laminated on a base plate, and, letting the diffraction gratings be assumed to be a first diffraction grating, a second diffraction grating and an L-th diffraction grating, as counted from the base plate, a grating thickness of the first diffraction grating be denoted by d1, a grating thickness of the second diffraction grating be denoted by d2, a grating thickness of the L-th diffraction grating be denoted by dL, a refractive index of the first diffraction grating at a wavelength λ be denoted by n1(λ), a refractive index of the second diffraction grating at the wavelength λ be denoted by n2(λ), a refractive index of the L-th diffraction grating at the wavelength λ be denoted by nL(λ), an arbitrary wavelength within a useful wavelength region be denoted by λ0, and a design order of diffraction be denoted by m, it is preferable to satisfy the following condition:

$$0.8755 \leq$$
$$\{(n1(\lambda 0)-1)d1 \pm (n2(\lambda 0)-1)d2 \pm \ldots \pm (nL(\lambda 0)-1)dL\}/m\lambda 0 \leq 1.1245.$$

In a mode of the diffractive optical element according to the invention, the design wavelengths include at least two design wavelengths which are shorter than a center wavelength of a useful wavelength region.

In another mode of the diffractive optical element according to the invention, the useful wavelength region is a visible spectrum.

In a further mode of the diffractive optical element according to the invention, the diffraction gratings made of at least three kinds of materials which differ in dispersion include at least one kind of grating structure whose grating thickness within one period monotonously increases between materials which differ in dispersion and at least one kind of grating structure whose grating thickness within one period monotonously decreases between materials which differ in dispersion.

In a still further mode of the diffractive optical element according to the invention, the first diffraction grating and the base plate are made of the same material.

Further, there is provided an optical system as a part of which one of the above diffractive optical elements according to the invention is used. The optical system includes, in particular, an image forming optical system and an observation optical system.

The above and other objects and features of the invention will become apparent from the following detailed description of preferred embodiments thereof taken in connection with the accompanying drawings.

DETAILED DESCRIPTION OF THE INVENTION

Hereinafter, preferred embodiments of the invention will be described in detail with reference to the drawings.

Figure 1:
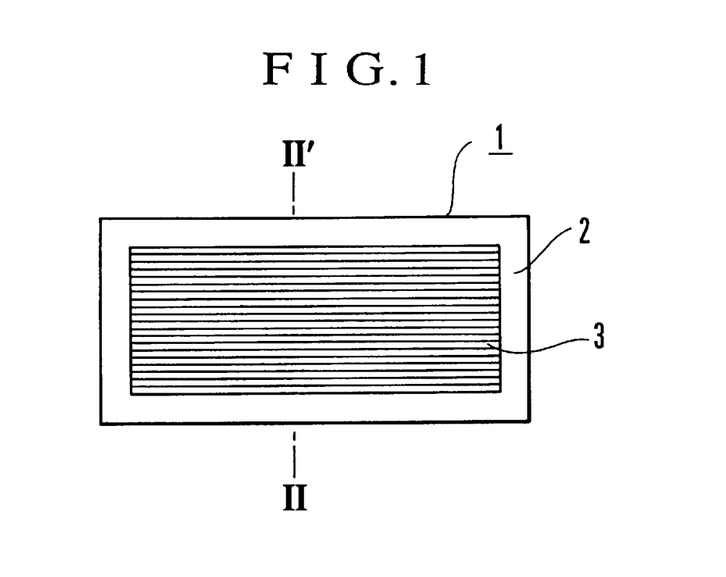
FIG. 1 is a plan view showing essential parts of a diffractive optical element according to a first embodiment of the invention.

FIG. 1 is a frontview showing a diffractive optical element according to a first embodiment of the invention. Referring to FIG. 1, the diffractive optical element 1 is composed of a diffraction grating part 3 formed on the surface of a base plate 2.

Figure 2:
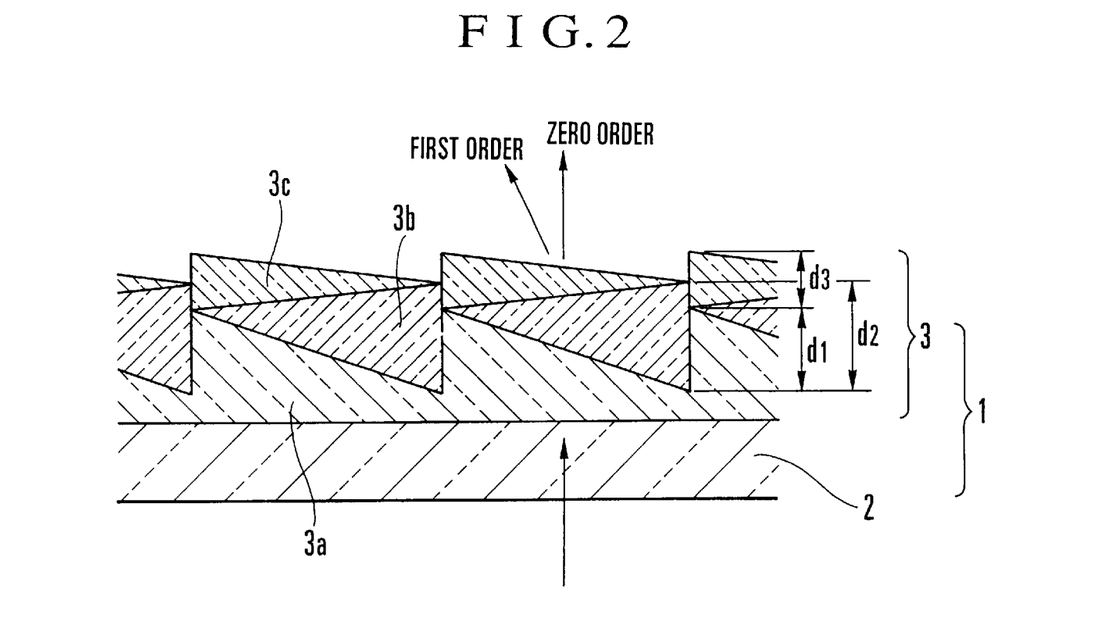
FIG. 2 is a sectional view taken along a line 11—11' of FIG. 1.

FIG. 2 is a sectional view of the diffractive optical element taken along a line 11—11' of FIG. 1. The diffractive optical element 1 is shown in a shape which is exaggerated in the direction of depth of diffraction gratings. The sectional shape of the diffractive optical element 1 includes a first diffraction grating 3a formed on the base plate 2, a second diffraction grating 3b formed on the first diffraction grating 3a, and a third diffraction grating 3c formed on the second diffraction grating 3b. These diffraction gratings 3a, 3b and 3c are laminated one on top of another.

Further, the shape of each diffraction grating in the first embodiment is such that the grating thickness of the first and third diffraction gratings 3a and 3c is arranged to monotonously (monotonically) decrease from left to right within one period, as viewed in FIG. 2, while the grating thickness of the second diffraction grating 3b is arranged to monotonously increase within one period. Thus, at least one diffraction grating of the two kinds of grating shapes differently changing the grating thickness is overlaid upon another diffraction grating which is of the other grating shape.

Next, a combination of the materials of the first, second and third diffraction gratings 3a, 3b and 3c and a grating shape by which the diffraction efficiency can be enhanced at the design order of a diffractive optical element over a wide region of wavelengths are described as follows.

In the case of an ordinary transmission type single-layer diffraction grating which is to be used in air, as shown in FIG. 12, a condition for maximizing the diffraction efficiency for a design wave length $\lambda 0$ is as follows. When a light flux is perpendicularly incident on the diffraction grating 3, the optical path length difference d0 between the crest and the trough of the diffraction grating 3 is arranged to be integer times as much as the design wavelength $\lambda 0$, as expressed below:

$$d0 = (n0-1)\ d = m\lambda 0 \ldots \quad (2)$$

where n0 represents the refractive index of the material at the wavelength $\lambda 0$, d represents a grating thickness (difference between the maximum thickness and the minimum thickness of the diffraction grating), and m represents the number of a diffraction order.

When light of a wavelength $\lambda$ is perpendicularly incident on the diffraction grating which has an optical path length difference d(λ), the diffraction efficiency η of the ordinary single-layer diffractive optical element can be expressed as follows:

$$\eta = \text{sinc}^2\{d(\lambda)/m\lambda - 1\} \quad (3)$$
$$= \text{sinc}^2\{(n(\lambda) - 1)d/m\lambda - 1\}$$

where n(λ) represents the refractive index of the material obtained at the wavelength λ.

A multilayer diffractive optical element which is composed of two or more layers is fundamentally the same as the single-layer diffractive optical element. In order to have the multilayer diffractive optical element act as one diffraction grating through all the component layers, an optical path length difference d(λ) is obtained from the grating thickness of each diffraction grating. Then, with the optical path length difference values obtained for all the layers are added together to obtain a sum. The multilayer diffractive optical element is formed in such a way as to make the sum integer times as large as the design wavelength. In FIG. 2, the first embodiment is arranged to be a three-layer diffractive optical element. However, the invention is not limited to this structure but is applicable to a diffraction grating structure composed of more than three laminated layers. In this case, the grating thickness is assumed to be a difference between the maximum thickness and the minimum thickness within one period of each diffraction grating, and the refractive index at the wavelength λ0 of the material of the L-th layer is assumed to be nOL. Then, a formula which applies to a multilayer diffractive optical element and corresponds to the formula (2) can be expressed as follows:

$$(n01 - 1)d1 \pm (n02 - 1)d2 \pm \ldots \pm (n0L - 1)dL = m\lambda 0. \quad (4)$$

The same condition that has been described above for the single-layer diffractive optical element applies also to the multilayer laminated type diffractive optical element from the viewpoint of a difference in optical path length. In the case of the multilayer diffractive optical element, when light of a wavelength λ is perpendicularly incident on the diffraction grating having the optical path length difference d(λ), its diffraction efficiency η becomes as expressed by the following formula:

$$\eta = \text{sinc}^2\{d(\lambda)/m\lambda - 1\} \quad (5)$$
$$= \text{sinc}^2[\{(n1(\lambda) - 1)d1 \pm (n2(\lambda) - 1)d2 \pm \ldots \pm$$
$$(nL(\lambda) - 1)dL\}/m\lambda - 1]$$

where nL(λ) represents the refractive index obtained at wavelength λ of the material of the L-th layer, i.e., the L-th diffraction grating.

With diffraction of light to the left from the zero-order diffraction light as viewed in FIG. 2 assumed to be in a positive diffraction order, the sign "±" shown in the formula (5) above becomes as follows. A grating shape in which the thickness of grating decreases from the left to the right as viewed in FIG. 2, i.e., the shape of the diffraction gratings 3a and 3c, is deemed to be in the positive direction of diffraction. Conversely, a grating shape in which the grating thickness increases from the left to the right, i.e., the shape of the diffraction grating 3b, is deemed to be in the negative direction of diffraction.

It is a feature of the invention that there are three wavelengths at which the diffraction efficiency is at a maximum rate to satisfy the formula (4) within the useful wavelength region, that is, there are three design wavelengths. Compared with the arrangements of the prior example, the arrangement of the invention gives a higher rate of diffraction efficiency over the whole region of useful wavelengths.

The embodiment of the invention is further described on the basis of its practical arrangement by way of example as follows. In the case of one example, the useful wavelength region is a visual spectrum, the design order of the diffraction grating is a + first order (m=1), and there are three design wavelengths. In this case, at least three kinds of materials which differ in dispersion are required. For simplification of description, the diffractive optical element is assumed to be of a minimum feasible structure composed of three layers of diffraction gratings made of three different kinds of materials.

With the useful wavelength region assumed to be the visible spectrum, the diffractive optical element is assumed to have three design wavelengths, i.e., a wavelength of 410 nm, the wavelength of F-line and the wavelength of C-line. In this case, a plastic resin material, PMMA (nd=1.49171, vd=57.4), is used for the first diffraction grating 3a. A plastic resin material, PC (nd=1.58306, vd=30.2), is used for the second diffraction grating 3b. An ultraviolet curable resin, HV 16 (nd=1.5980, vd=28.0), which is a product of ADEERU Co., is used for the third diffraction grating 3c.

Accordingly, the refractive index n1 of the first diffraction grating 3a is 1.50634 at the wavelength of 410 nm, 1.49773 at the wavelength of F-line, and 1.48917 at the wavelength of C-line. The refractive index n2 of the second diffraction grating 3b is 1.61362, 1.59679 and 1.57750 at these wavelengths, respectively. The refractive index n3 of the third diffraction grating 3c is 1.63482, 1.61319 and 1.59183 at these wavelengths, respectively. Therefore, according to the formula (4), there are established the following formulas:

$$(1.50634 - 1)d1 + (1.61362 - 1)d2 + (1.63482 - 1)d3 = 0.41 \quad (6)$$

$$(1.49773 - 1)d1 + (1.59679 - 1)d2 + (1.61319 - 1)d3 = 0.48607 \quad (7)$$

$$(1.48917 - 1)d1 + (1.57750 - 1)d2 + (1.59183 - 1)d3 = 0.65627. \quad (8)$$

Since there are three variables for these three formulas, the thicknesses of the materials which satisfy all of these formulas can be univalently obtained. The solution of these formulas gives the values of grating thicknesses d1, d2 and d3 as follows: d1=27.50 μm, d2 =−36.22 μm and d3=13.73 μm. The grating thickness d2 is in a negative value in this case. This means that the purpose of the structural arrangement can be attained by causing the increase and decrease of the grating thickness d2 to be inverse to those of the other grating thicknesses d1 and d3. The diffraction efficiency η obtained at the wavelength of 410 nm and the wavelength of F-line and the wavelength of C-line becomes η=1.00, which is a maximum value, because the value inside "( )" of the formula (5) is obtained as "0" from "d0=mλ".

Figure 3:
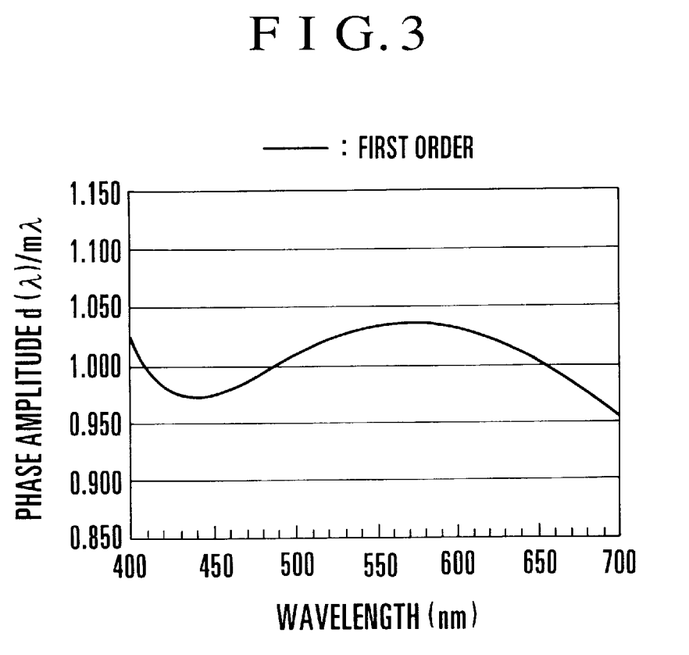
FIG. 3 is a graph for explaining the phase amplitude of the diffractive optical element according to the first embodiment.
Figure 4:
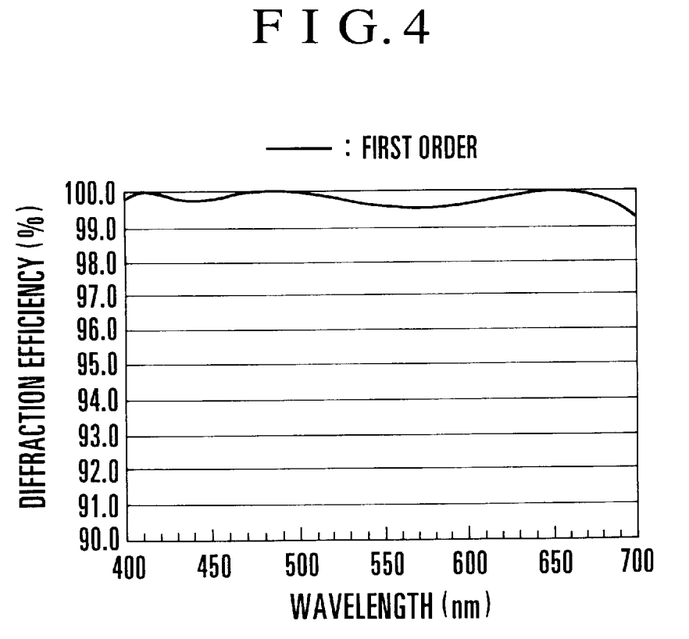
FIG. 4 is a graph showing the diffraction efficiency obtained at a design order of the diffractive optical element according to the first embodiment.
Figure 5:
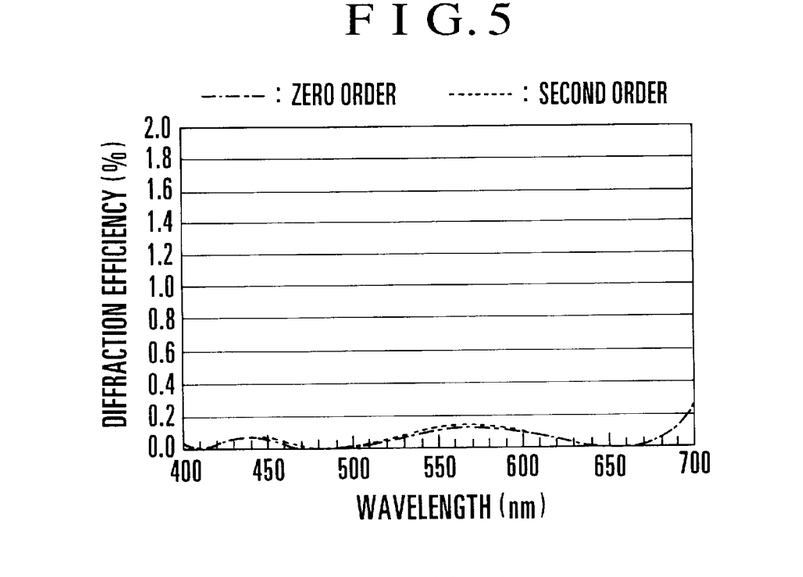
FIG. 5 is a graph showing the diffraction efficiency obtained at orders near the design order of the diffractive optical element according to the first embodiment.

The diffraction efficiency for light of other visible wavelengths is next obtained. Since the grating thickness has already been decided, the diffraction efficiency for each wavelength is computed according to the formula (5). FIG. 3 shows values of the phase amplitude d(λ)/mλ obtained for the respective wavelengths. FIG. 4 shows values of the diffraction efficiency obtained at the design order for the respective wavelengths. FIG. 5 shows values of the diffraction efficiency obtained at diffraction orders near the design order (zero and second orders) for the respective wavelengths.

As is understandable from FIG. 3, there are three design wavelengths where the phase amplitude becomes "1" within the visible spectrum. Further, the values of the phase amplitude at wavelengths other than the design wavelengths do not exceed 5%. This indicates that the diffraction efficiency at the design order is excellent and is at least 99% for the whole region of useful wavelengths. Further, the diffraction efficiency at other diffraction orders near the design order (zero and second orders) is also good as it takes a low value only equal to or less than 0.3%.

With the materials appositely selected as described above, the diffractive optical element is formed to have a high diffraction efficiency for the whole useful wavelength region.

The above description shows that a diffractive optical element which is capable of satisfying conditions for attaining the object of the invention can be formed by selecting a combination of materials of three different kinds. In actually carrying out the invention, however, a search for the combination of materials and the grating thickness is made in the order of procedures reverse to the description given in the foregoing. For example, a rate of diffraction efficiency as desired is first decided. If the desired rate of diffraction efficiency is equal to or above 98%, the diffraction efficiency η can be expressed as follows:

$$\eta = \text{sinc}^2 (d(\lambda)/m\lambda - 1) \geq 0.98.$$

Then, the diffraction efficiency of at least 98% can be obtained for the whole useful wavelength region if "$d(\lambda)/m\lambda$" satisfies the following condition:

$$0.9217 \leq d(\lambda) m\lambda \leq 1.0783 \ldots \quad (9).$$

The above-stated optical path length difference $$d(\lambda) = (n1(\lambda) - 1)d1 \pm (n2(\lambda) - 1)d2 \pm \ldots \pm (nL(\lambda) - 1)dL$$

is substituted into the formula (9) to obtain the following expression:

$$0.9217 \leq \quad (10)$$
$$\{(n1(\lambda) - 1)d1 \pm (n2(\lambda) - 1)d2 \pm \ldots \pm (nL(\lambda) - 1)dL\}/m\lambda \leq 1.0783.$$

In the last place, a search is made for the refractive index of materials and the grating thickness which satisfy the condition expressed by the formula (10) above. Then, the shape of grating and the materials to be employed are decided according to the result of the search. In a case where a rate of diffraction efficiency which is at least 95%, instead of 98%, is acceptable, the formula (10) becomes as shown below:

$$0.8755 \leq \quad (11)$$
$$\{(n1(\lambda) - 1)d1 \pm (n2(\lambda) - 1)d2 \pm \ldots \pm (nL(\lambda) - 1)dL\}/m\lambda \leq 1.1245.$$

Such a modification increases the kinds of materials which can be combined with each other and thus broadens the range of selection of such materials that are inexpensive and excel in durability.

In the foregoing, a diffractive optical element having three design wavelengths, the three layers of materials and the shape of grating have been described. In this case, as apparent from the graph of the phase amplitude of FIG. 3, the rate of change in phase amplitude is great at shorter wavelengths. Therefore, it is preferable to have at least two of the three design wavelengths on the shorter wavelength side of the center wavelength of the useful wavelength region. With the design wavelengths arranged in this manner, the value of the phase amplitude can be lessened over the whole region of useful wavelengths and the rate of diffraction efficiency can be enhanced.

The rate of change in phase amplitude can be lessened by arranging a difference in wavelength between the design wavelengths to be at least 50 nm. By virtue of such an arrangement, even if the phase amplitude has some error due to a manufacturing error, etc., the eventual change in diffraction efficiency can be lessened.

Figure 6:
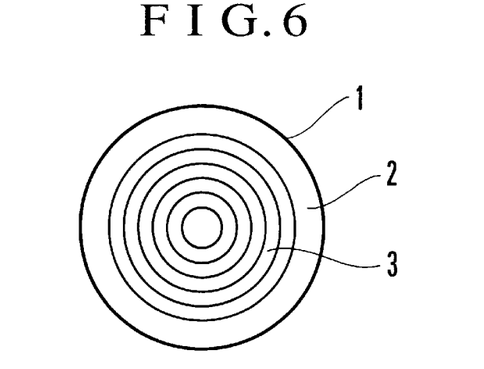
FIG. 6 shows a diffractive lens to which the diffractive optical element according to the first embodiment is applied.

The diffraction grating shape has been described by limiting it to a shape obtained within one period of diffraction grating. However, it is known that the diffraction efficiency is basically not affected by the pitch of diffraction grating. In other words, the arrangement of the first embodiment described above is applicable not only to the one-dimensional diffraction grating shown in FIG. 1 but also to diffractive optical elements of any different grating pitch shapes, including a diffractive lens shown in FIG. 6.

Figure 7:
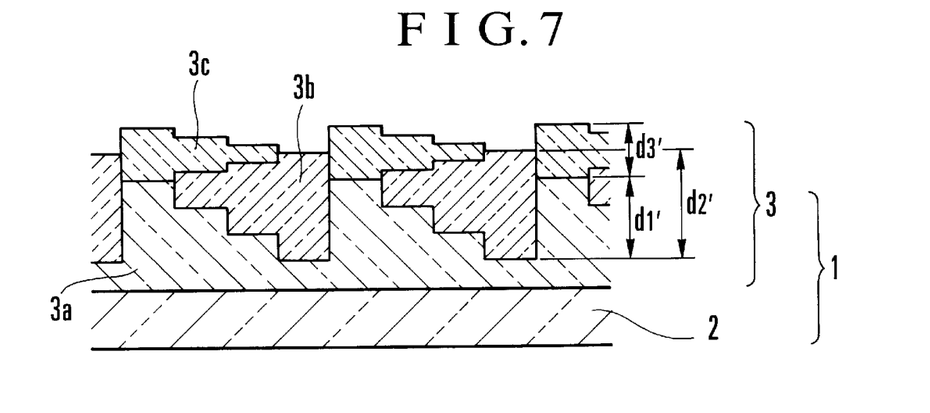
FIG. 7 is a sectional view showing a binary grating shape related to the diffractive optical element according to the first embodiment.

Further, the sectional shapes of grating include a kinoform shape as shown in FIG. 1 and a stepped shape as shown in FIG. 7. However, the invention is not limited to these shapes but applies to any other known shapes.

However, in the case of the stepped shape shown in FIG. 7, the actual grating thickness dL' is in the following relation to the grating thickness dL of the kinoform shape: dL'=dL * (N-1) / N, where N represents the number of steps of the stepped grating. In a case where the diffractive optical element is in the stepped shape, the actual grating thickness d' differs from the grating thickness d used in deciding the optical path length difference.

The first embodiment as described above is a diffractive optical element having a diffraction grating part arranged on a flat plate. However, the same advantageous effect can be attained by arranging the diffraction grating part on a curved lens.

In the first embodiment, the first diffraction grating is formed on the base plate. The base plate and the first diffraction grating may be molded together by molding one and the same material.

Further, in the first embodiment, the design diffraction order is the first order. It is, however, not limited to the first order. With the design order arranged to be other than the first order, such as the second order, the same advantageous effect is attainable by setting a composite optical path length difference, with respect to at least three wavelengths, in such a way as to have the design wavelengths at the desired diffraction order.

Next, a diffractive optical element according to a second embodiment of the invention is described as follows.

Figure 8:
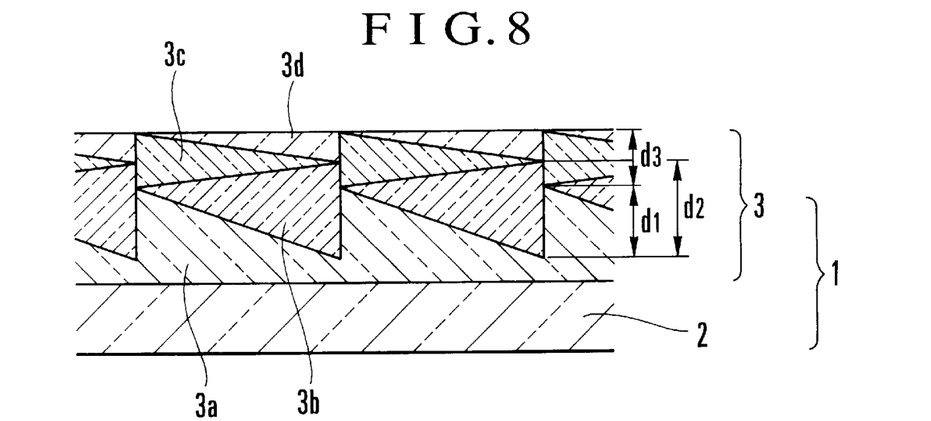
FIG. 8 is a sectional view showing essential parts of a diffractive optical element according to a second embodiment of the invention.

In the first embodiment, a diffractive optical element having three design wavelengths is formed by diffraction gratings in a structure composed of three layers, which are least in number according to the invention. For that reason, a grating surface is formed even at the last end part of the diffraction grating. In the second embodiment, on the other hand, the last end part of its diffraction grating structure is arranged to be a flat surface by adding another diffraction grating 3d as shown in FIG. 8. In this case, since there is no diffraction surface at the last end part, the provision of the additional diffraction grating 3d obviates the necessity of the arrangement to prevent dust from sticking to a grating groove or to add an anti-reflection coating, so that the second embodiment can be handled more easily as an element than the first embodiment.

A diffraction optical element according to a third embodiment of the invention is next described.

In each of the first and second embodiments, the thickness of the thinnest part of each of the second and third diffraction gratings 3b and 3c is arranged to be "0". This arrangement has the second and third diffraction gratings divided at every grating pitch. In the event of manufacture by molding with a mold, such a structural arrangement presents a problem, because the diffractive optical element cannot be readily peeled off and transferred from the mold.

Figure 9:
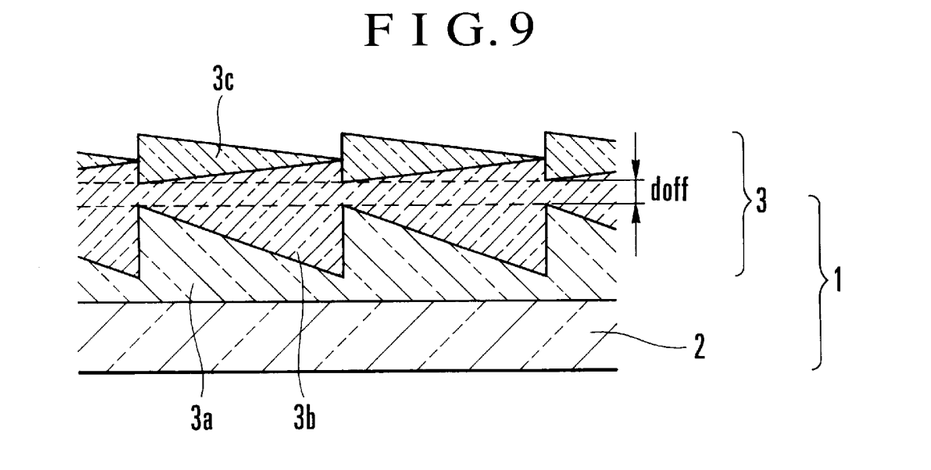
FIG. 9 is a sectional view showing essential parts of a diffractive optical element according to a third embodiment of the invention.

To solve this problem, in the third embodiment, a layer of a material which is the same as the material of the second diffraction grating 3b is added to the whole area of the diffraction grating part 3 with a uniform thickness "doff", as shown in FIG. 9. By this additional layer the grating sections of the second diffraction grating 3b are interconnected, so that the diffraction grating can be readily peeled off from a mold in the event of molding by the mold. If the third and fourth diffraction gratings 3c and 3d are arranged also in this manner, all the grating parts can be easily molded.

Figure 10:
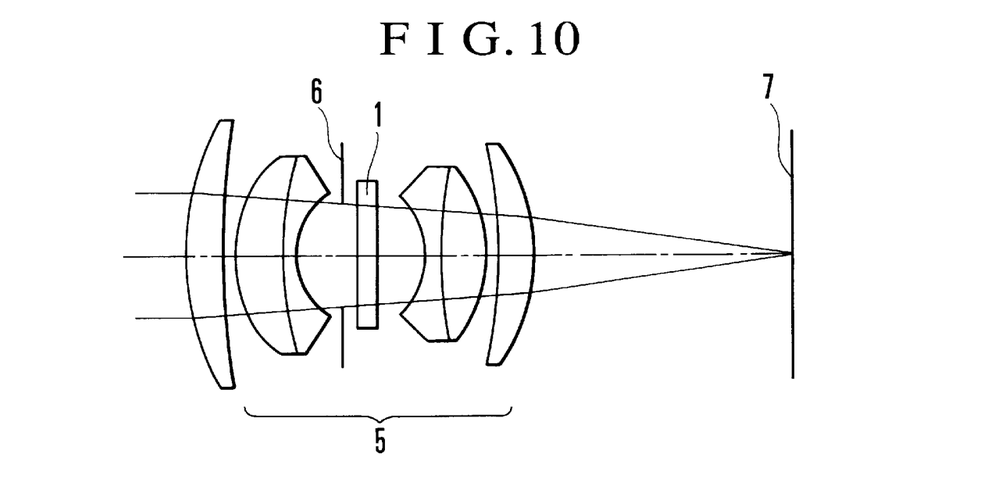
FIG. 10 schematically shows an optical system using the diffractive optical element according to a fourth embodiment of the invention.

FIG. 10 shows as a fourth embodiment of the invention an optical system using a diffractive optical element arranged according to the invention.

In FIG. 10, reference numeral 5 denotes a phototaking lens. A diaphragm 6 and the diffractive optical element 1 according to the invention are disposed inside of the phototaking lens 5. An image forming plane 7 is a photosensitive surface of a film.

In this case, the photo-taking lens is set to have a predetermined transmission factor by the sum of the transmission factor of the refractive lens part and the diffraction efficiency (transmission factor) of the diffraction grating part which is arranged according to the invention. In the case of the conventional diffraction grating, the diffraction efficiency (transmission factor) of the diffraction grating varies to a considerable degree according to wavelengths as shown in FIG. 13. In order to obtain a spectral characteristic required for a photo-taking lens, therefore, it has been necessary to use a filter such as a dichroic coating for correcting the transmission characteristic of the diffractive optical element. Further, in order to make the spectral characteristic into the desired characteristic, it is necessary to correct only the color of the spectral characteristic of a composite transmission by dropping the quantity of diffraction light of wavelengths near the design wavelength. As a result, it has been inevitable to have a relatively large amount of loss in the quantity of light.

According to the invention, on the other hand, the diffractive optical element is arranged to retain its diffraction efficiency at a high rate for the useful wavelength region. Therefore, the diffractive optical element can be handled in the same manner as an ordinary refractive lens without necessitating use of any special coating. Further, since the diffraction efficiency at orders near the design order of diffraction is adequately suppressed, the generation of flare light under the unusual photo-taking condition mentioned in the foregoing can be greatly reduced.

In the case of FIG. 10, the diffractive optical element is disposed on a plate glass surface in the neighborhood of the diaphragm. However, the position of the diffractive optical element is not limited to this position. The diffractive optical element may be arranged on a curved lens surface, such as a convex or concave surface. It is also possible to use a plurality of diffractive optical elements within the photo-taking lens.

In the case of the fourth embodiment, the invention is applied to the photo-taking lens of a camera. However, the invention is not limited to this. The same advantageous effect can be attained by applying the invention to a phototaking lens of a video camera, an image scanner of a business machine, a reader lens of a digital copying machine, etc.

Figure 11:
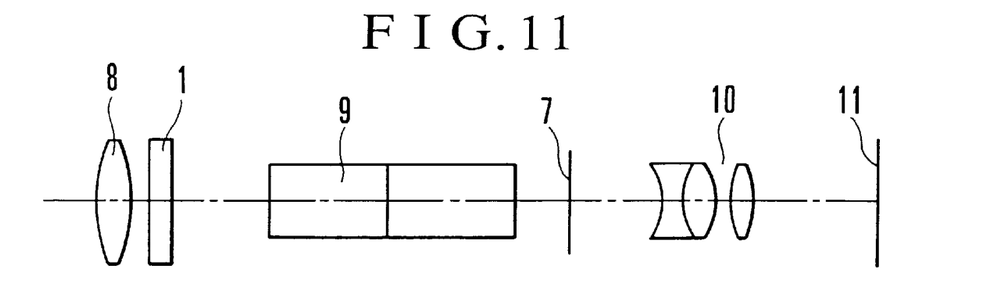
FIG. 11 schematically shows another optical system using the diffractive optical element according to a fifth embodiment of the invention.

FIG. 11 is a sectional view showing as a fifth embodiment of the invention an optical system using a diffractive optical element arranged according to the invention.

The optical system shown in FIG. 11 is an observation optical system of a binocular or the like. The observation optical system includes an objective lens 8, an image inverting prism 9 for erecting an image, an eyepiece lens 10, and an evaluation plane (pupil surface) 11. In FIG. 11, reference numeral 1 denotes a diffractive optical element arranged according to the invention. The diffractive optical element 1 is provided for the purpose of correcting a chromatic aberration, etc., of the objective lens 8 on the image forming plane 7.

In the case of the fifth embodiment, the diffractive optical element 1 is disposed on the side of the objective lens 8. However, the position of the diffractive optical element 1 is not limited to this position. The same effect can be attained by setting the diffractive optical element 1 on the surface of the prism 9 or inside of the eyepiece lens 10. However, with the diffractive optical element 1 set on the object side of the image forming plane 11, it serves to abate a chromatic aberration caused solely by the objective lens 8. Therefore, in the case of an observation system for observation with the eye, it is preferable to have the diffractive optical element 1 set at least on the side of the objective lens.

Further, in the case of the fifth embodiment, the invention is applied to a binocular. However, the same effect is attainable by applying the invention to a terrestrial or astronomical telescope or to an optical viewfinder of a lens-shutter camera, a video camera, or the like.

According to the arrangement of each embodiment disclosed, a plurality of diffraction gratings are appositely laminated on a base plate. By this arrangement, a diffractive optical element and an optical system having the diffractive optical element can be arranged to have a high rate of diffraction efficiency to lessen unevenness of color over the whole useful wavelength region.

What is claimed is:

1. A diffractive optical element formed by laminating at least three layers of diffraction gratings made of at least three kinds of materials which differ in dispersion, wherein thicknesses and materials of said diffraction gratings are determined in such a manner that diffraction efficiency for each of at least three wavelengths in an operable wavelength spectrum becomes 100%.

2. A diffractive optical element according to claim 1, wherein said at least three layers of diffraction gratings are laminated on a base plate, and wherein letting said diffraction gratings be assumed to comprise L diffraction gratings, L being three or more, including a first diffraction grating, a second diffraction grating, and up through an L-th diffraction grating, as counted from the base plate, a grating thickness of said first diffraction grating be denoted by d1, a grating thickness of said second diffraction grating be denoted by d2, a grating thickness of the L-th diffraction grating be denoted by dL, a refractive index of said first diffraction grating at a wavelength λ be denoted by n1(λ), a refractive index of said second diffraction grating at the wavelength λ be denoted by n2(λ), a refractive index of the L-th diffraction grating at the wavelength $\lambda$ be denoted by $nL(\lambda)$, a wavelength within the operable wavelength spectrum be denoted by $\lambda 0$, and a design order of diffraction be denoted by m, the following condition is satisfied:

$$0.9217 \leq \left\{ (n1(\lambda 0) - 1)d1 + \sum_{i=2}^{i=L} \pm (ni(\lambda 0) - 1)di \right\} \bigg/ m\lambda 0 \leq 1.0783.$$

3. A diffractive optical element according to claim 1, wherein said at least three layers of diffraction gratings are laminated on a base plate, and wherein letting said diffraction gratings be assumed to comprise L diffraction gratings, L being three or more, including a first diffraction grating, a second diffraction gratings and up through an L-th diffraction grating, as counted from the base plate, a grating thickness of said first diffraction grating be denoted by d1, a grating thickness of said second diffraction grating be denoted by d2, a grating thickness of said L-th diffraction grating be denoted by dL, a refractive index of said first diffraction grating at a wavelength $\lambda$ be denoted by $n1(\lambda)$, a refractive index of said second diffraction grating at the wavelength $\lambda$ be denoted by $n2(\lambda)$, a refractive index of said L-th diffraction grating at the wavelength $\lambda$ be denoted by $nL(\lambda)$, a wavelength within the operable wavelength spectrum be denoted by $\lambda 0$, and a design order of diffraction be denoted by m, the following condition is satisfied:

$$0.8755 \leq \left\{ (n1(\lambda 0) - 1)d1 + \sum_{i=2}^{i=L} \pm (ni(\lambda 0) - 1)di \right\} \bigg/ m\lambda 0 \leq 1.1245.$$

4. A diffractive optical element according to claim 1, wherein the at least three wavelengths include at least two wavelengths which are shorter than a center wavelength of the operable wavelength spectrum.

5. A diffractive optical element according to claim 4, wherein the operable wavelength spectrum is a visible spectrum.

6. A diffractive optical element according to claim 1, wherein said diffraction gratings include at least one kind of grating structure whose grating thickness within one period monotonically increases between materials which differ in dispersion and at least one kind of grating structure whose grating thickness within one period monotonically decreases between materials which differ in dispersion.

7. A diffractive optical element according to claim 2, wherein said first diffraction grating and said base plate are made of the same material.

8. A diffractive optical element according to claim 3, wherein said first diffraction grating and said base plate are made of the same material.

9. A diffractive optical element formed by laminating L diffraction gratings, L being three or more, including a first diffraction grating, a second diffraction grating, and up through an L-th diffraction grating, wherein, letting a grating thickness of said first diffraction grating be denoted by d1, a grating thickness of said second diffraction grating be denoted by d2, a grating thickness of said L-th diffraction grating be denoted by dL, a refractive index of said first diffraction grating at a wavelength $\lambda$ be denoted by $n1(\lambda)$, a refractive index of said second diffraction grating at the wavelength $\lambda$ be denoted by $n2(\lambda)$, a refractive index of said L-th diffraction grating at the wavelength $\lambda$ be denoted by $nL(\lambda)$, a wavelength within an operable wavelength spectrum be denoted by $\lambda 0$, and a design order of diffraction be denoted by m, the following condition is satisfied:

$$0.9217 \leq \left\{ (n1(\lambda 0) - 1)d1 + \sum_{i=2}^{i=L} \pm (ni(\lambda 0) - 1)di \right\} \bigg/ m\lambda 0 \leq 1.0783.$$

10. A diffractive optical element according to claim 9, wherein the operable wavelength spectrum is a visible spectrum.

11. A diffractive optical element formed by laminating L diffraction gratings, L being three or more, including a first diffraction grating, a second diffraction grating, and up through an L-th diffraction grating, wherein, letting a grating thickness of said first diffraction grating be denoted by d1, a grating thickness of said second diffraction grating be denoted by d2, a grating thickness of said L-th diffraction grating be denoted by dL, a refractive index of said first diffraction grating at a wavelength $\lambda$ be denoted by $n1(\lambda)$, a refractive index of said second diffraction grating at the wavelength $\lambda$ be denoted by $n2(\lambda)$, a refractive index of said L-th diffraction grating at the wavelength $\lambda$ be denoted by $nL(\lambda)$, a wavelength within an operable wavelength spectrum be denoted by $\lambda 0$, and a design order of diffraction be denoted by m, the following condition is satisfied:

$$0.8755 \leq \left\{ (n1(\lambda 0) - 1)d1 + \sum_{i=2}^{i=L} \pm (ni(\lambda 0) - 1)di \right\} \bigg/ m\lambda 0 \leq 1.1245.$$

12. A diffractive optical element according to claim 11, wherein the operable wavelength spectrum is a visible spectrum.

13. An optical system comprising a diffractive optical element according to one of claims 1 to 12.

14. An optical system according to claim 13, wherein said optical system is an image forming optical system.

15. An optical system according to claim 13, wherein said optical system is an observation optical system.

16. A camera comprising an optical system according to claim 13.

17. An optical apparatus comprising an optical system according to claim 13.

* * * * *

UNITED STATES PATENT AND TRADEMARK OFFICE
CERTIFICATE OF CORRECTION

PATENT NO.   : 6,122,104
DATED        : September 19, 2000
INVENTOR(S)  : Takehiko Nakai It is certified that error appears in the above-identified patent and that said Letters Patent is hereby corrected as shown below:

Title page,
Item [56], References Cited, OTHER PUBLICATIONS,
"Optical Letters" should read -- Optics Letters --.

Column 1,
Line 13, "chromatic." should read -- chromatic --.

Column 5,
Line 24, "DRAWING" should read -- DRAWINGS --.
Line 29, "11-11'" should read -- II-II' --.

Column 6,
Line 19, "frontview" should read -- front view --.
Line 25, "11-11'" should read -- II-II' --.

Column 8,
Line 48, "is in" should read -- is --.

Column 9,
Line 32, "d($\lambda$) m$\lambda$" should read -- d($\lambda$)/m$\lambda$ --.

Column 13,
Line 17, "gratings and" should read -- grating, and --.

Signed and Sealed this

Eleventh Day of June, 2002

Attest:

JAMES E. ROGAN
Attesting Officer    Director of the United States Patent and Trademark Office